United States Patent [19]
Choinski et al.

[11] Patent Number: 5,636,562
[45] Date of Patent: Jun. 10, 1997

[54] SPRING BRAKE ACTUATOR WITH RELEASE TOOL REQUIRING LIMITED AXIAL SPACE

[75] Inventors: Graydon J. Choinski, Harrisburg; Richard F. Zarybnicky, Sr.; Ronald S. Plantan, both of Charlotte, all of N.C.

[73] Assignee: Indian Head Industries, Inc., Charlotte, N.C.

[21] Appl. No.: 515,239

[22] Filed: Aug. 15, 1995

[51] Int. Cl.⁶ .................................................. F01B 7/00
[52] U.S. Cl. ........................................ 92/63; 92/17
[58] Field of Search ................... 92/128, 62, 63, 92/17, 29

[56] References Cited

U.S. PATENT DOCUMENTS

| | | | |
|---|---|---|---|
| 3,117,496 | 1/1964 | Dobrikin | 92/63 |
| 3,282,169 | 11/1966 | Leighton . | |
| 3,326,090 | 6/1967 | Curse . | |
| 3,372,623 | 3/1968 | Wearden et al. . | |
| 3,495,503 | 2/1970 | Gummer et al. . | |
| 3,508,470 | 4/1970 | Swander et al. | 92/63 |
| 3,613,515 | 10/1971 | Swander, Jr. et al. . | |
| 3,782,251 | 1/1974 | Le Marchand | 92/63 |
| 3,994,205 | 11/1976 | Ekdahl et al. . | |
| 3,994,206 | 11/1976 | Dahlkvist et al. . | |
| 4,221,158 | 9/1980 | Klimek et al. . | |
| 4,263,840 | 4/1981 | Herrera . | |
| 4,364,305 | 12/1982 | Dalibout et al. . | |
| 4,890,540 | 1/1990 | Mullins . | |
| 4,907,496 | 3/1990 | Neal . | |
| 5,377,579 | 1/1995 | Pierce . | |

FOREIGN PATENT DOCUMENTS

| | | | |
|---|---|---|---|
| 0315395 | 5/1989 | European Pat. Off. | 92/63 |
| 2209570 | 9/1972 | Germany | 92/63 |
| 2414051 | 10/1974 | Germany | 92/63 |
| 1464726 | 11/1974 | United Kingdom | 92/63 |
| 2000225 | 1/1979 | United Kingdom . | |

*Primary Examiner*—Thomas E. Denion
*Attorney, Agent, or Firm*—Howard & Howard

[57] ABSTRACT

A brake release tool incorporates a two-part structure wherein a portion accessible from outside the brake actuator does not move axially away from the brake actuator during caging. In this way, less room is necessary outwardly of the brake actuator housing than has been required in the prior art. An operator turns an outer bolt, which turns a threaded inner nut. The threaded inner nut moves axially to contact a piston, and moves the piston to cage the power spring. The bolt need not move axially outwardly, although in one embodiment it may move slightly axially inwardly as the spring is caged to provide a visual indication that the spring is not uncaged.

11 Claims, 6 Drawing Sheets

_Fig - 4_

_Fig - 5_

Fig-6A

IFig - 6B

Fig - 6C

SPRING BRAKE ACTUATOR WITH RELEASE TOOL REQUIRING LIMITED AXIAL SPACE

BACKGROUND OF THE INVENTION

This application relates to an improved release tool for a spring brake actuator that cages the power spring of the brake actuator without axial movement outwardly of the actuator housing.

Spring brake actuators are utilized on modern heavy vehicles to actuate a brake when the vehicle is parked, or when a portion of the vehicle brake system fails. In either situation, a powerful spring expands to move a mechanical rod that actuates the brake actuator. This actuation will sometimes occur while the vehicle is on the road. An operator of the vehicle will then need to cage the spring such that the vehicle may be moved. Servicing of a spring brake actuator and, in particular, servicing of the parking side (where the power spring is located), is not recommended. Even so, in the event that one does attempt to open the parking side, the spring must be caged by a mechanical element prior to any such opening. The power spring is also typically caged when the actuator is removed, installed or when the vehicle is towed.

Thus, release tools have typically been provided in the parking side of a spring brake actuator. The release tools have typically been a bolt that is received within a piston that holds the power spring. When the bolt is turned it pulls the power spring piston toward an outer end of the housing, holding or "caging" the spring. The bolt has typically moved axially outwardly of the housing as it is turned. Thus, in prior art spring brake actuators, the release bolt typically extends axially outwardly from an outer end of the brake actuator housing when the power spring is fully caged.

While this type of release bolt has proven successful, in many applications, there may not be sufficient axial room for the release bolt to extend axially from the brake actuator. Thus, there are desirable benefits to providing a release bolt that does not extend axially away from the actuator when the power spring is caged. The prior art has not successfully provided an arrangement to achieve the goal of allowing reliable caging of the power spring, while at the same time not requiring additional axial clearance at the outer end of the spring brake actuator chamber.

In one proposed prior art spring brake actuator, a well or space received the release bolt and extended far into the housing. In fact, the release bolt extended axially inwardly beyond portions of the power spring. Such an arrangement provides some room for outward movement of the release bolt during caging. However, the proposed prior art system does not indicate that the brake would be fully caged when the release bolt head is aligned with the outer end of the housing. Thus, the bolt may need to extend outwardly from the housing. Moreover, in the proposed configuration, it would appear that a long socket wrench would be required to turn the bolt, and would itself require additional axial space. As such, this proposed prior art spring brake does not achieve the goals of the present invention.

SUMMARY OF THE INVENTION

In a disclosed embodiment of this invention, a spring brake actuator is provided with a release tool that does not extend axially outwardly beyond its initial position as it cages the power spring. In one preferred embodiment of this invention, a release bolt has a head accessible from outside the brake actuator housing. The bolt engages an internal threaded nut. Turning the head of the bolt moves the nut axially. The nut engages and moves a spring piston. The spring piston is thus pulled axially toward an outer end of the brake housing, caging the power spring. The bolt head does not move axially away from the brake actuator head during this movement, and thus additional axial space outwardly of the brake actuator is not necessary.

In other preferred features, the nut is initially maintained by a spring at a location such that it is aligned with an initial thread on the bolt. When an operator begins to turn the bolt, the nut is immediately engaged by the thread and begins to be withdrawn toward the outer end of the housing. On the other hand, since the nut is initially not actually engaged with the thread, should an operator begin to turn the bolt in the wrong direction, the nut will not be driven away from the outer end of the brake actuator. In this way, the present invention insures that there is not movement of the nut in a direction that would impede the normal operation of the brake actuator.

In another feature of this invention, the nut has an outer periphery that matches the profile of an inner bore in the piston. The nut may slide within this inner bore during normal operation of the brake.

In one embodiment, a spring biases the nut towards the bolt. Before the nut contacts the spring piston, this spring will bias the nut and bolt slightly axially outwardly. The bolt extends a small distance away from the outer portion of the brake actuator housing. An observer seeing this bolt head spaced slightly axially outwardly from the housing will know that the brake actuator is uncaged. In this embodiment, when the operator begins to turn the bolt, the nut eventually contacts a flange on the spring piston, begins to cage the power spring and takes up the clearance. Initially after this contact, the spring force which is biasing the nut outwardly is first overcome, such that the bolt head does move inwardly from the power spring is completely caged before the outward position discussed above. An observer seeing the bolt head in this position will recognize that the power spring is partially or fully caged. Most preferably, a snap ring on the bolt abuts the inner side of the housing when the bolt is moved outwardly by the spring to its outer position. This snap ring defines a stop limiting outward movement of the bolt.

In other features, an O-ring is positioned on an outer peripheral surface of the bolt at a position such that it provides a seal with the outer housing, and during movement of the bolt as described above. This O-ring in conjunction with the spring at an inner end of the bolt provides a centering force to stabilize the bolt and dampen the effect of vibrations on the bolt.

In other embodiments, the bolt may be utilized without the small spring. In this embodiment, the bolt does not pop up when uncaged, and the nut is received on threads at all times. Other operational aspects of this embodiment are similar to those discussed above.

Further, in other embodiments, the invention includes a hollow push rod that receives a portion of the length of the bolt and the nut. In this way, the length of the release bolt does not increase the overall length of the brake actuator. Rather a portion of the length of the release bolt may extend axially inwardly beyond the power spring and into the push rod to reduce the required outer envelope size for the brake actuator.

In other features, the invention may be utilized on either piston or diaphragm brakes.

In a method of operating a spring brake actuator to cage a power spring according to the present invention, a bolt is received within a threaded nut. The nut is received within a portion of a spring piston such that when the bolt is turned the nut engages the spring piston and draws it toward an outer end of the brake housing head. The method includes the steps of turning the release bolt head, thereby turning the nut until the nut engages the spring piston. The method further envisions continued turning of the head such that the nut begins to move the spring piston until the spring is fully caged.

These and other features of the present invention can be best understood from the following specification and drawings, of which the following is a brief description.

DETAILED DESCRIPTION OF A PREFERRED EMBODIMENT

Figure 1:
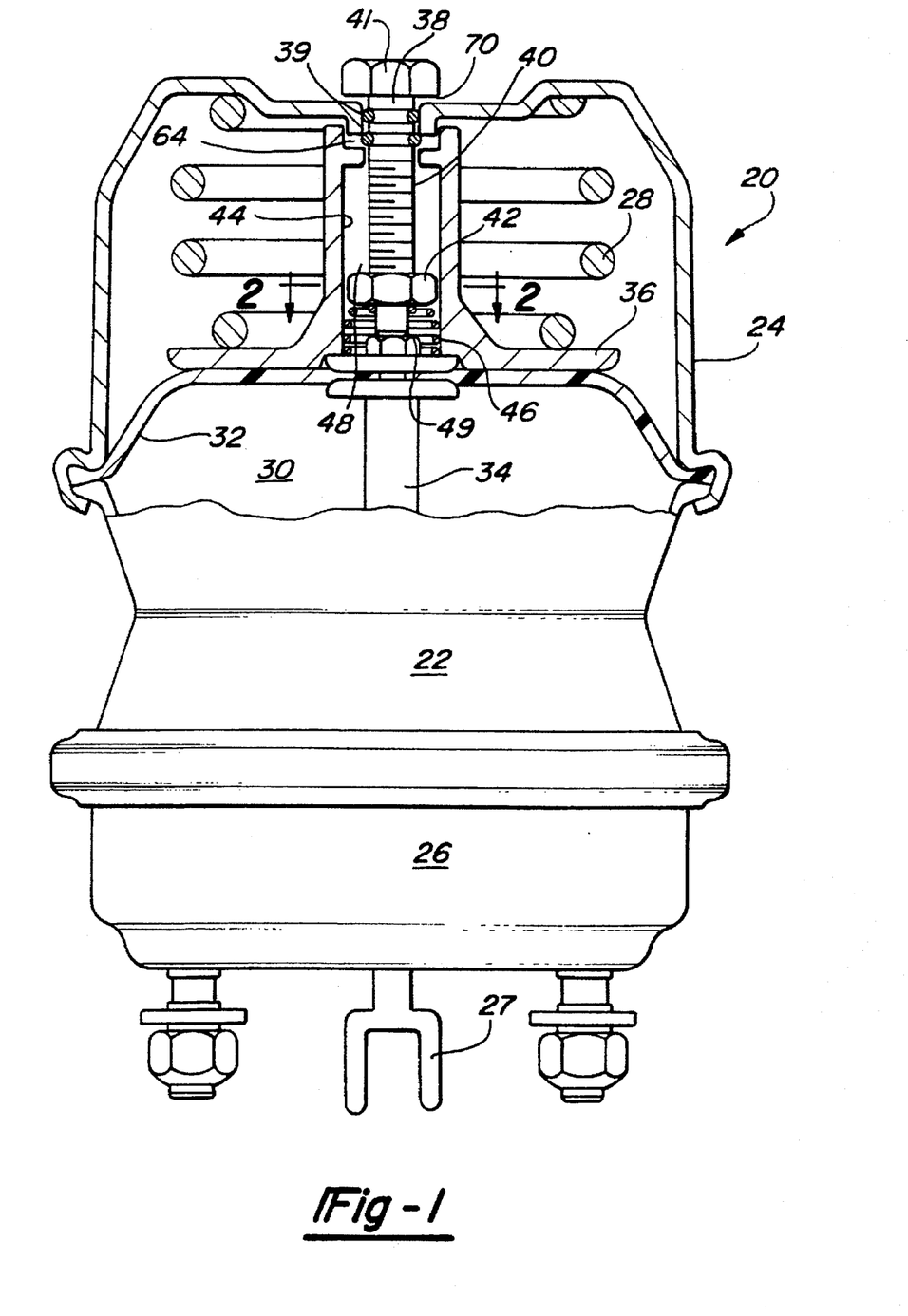
FIG. 1 is a partially cross-sectional view of a spring brake actuator incorporating the present invention.

FIG. 1 shows a spring brake actuator 20. The structure of the spring brake actuator other than that relating to the release tool mechanism is as known in the art. Thus, a detailed description of all components of the brake actuator will not be included. As is known, a spring brake actuator includes a central housing body 22, typically referred to as a flange case that connects an outer brake housing member 24, sometimes known as a head to an inner brake housing 26, sometimes known as a service chamber. Within the head is a power spring 28. Spring 28 selectively engages a brake through the yoke 27 upon certain conditions, as known. A chamber 30 is defined beneath a diaphragm 32. When pressurized air is received within chamber 30, diaphragm 32 moves upwardly compressing the spring 28. In that condition, a push rod 34 associated with the diaphragm 32 is also moved upwardly. In this position, the spring 28 is not actuated, and the push rod 34 is not forced downwardly. The parking side of the brake actuator thus does not move the yoke 27 to actuate the brake. When the parking brakes are turned on, or if there is some failure in the system, then spring 28 expands, forcing the push rod 34 downwardly to move the yoke 27 outwardly.

The spring 28 is received on a spring piston 36. A release bolt 38 extends through the brake housing 24. An O-ring seal 39 provides an air-tight seal between bolt 38 and the housing portion 24. A threaded bolt portion 40 extends from the bolt head 41. A nut 42 is received on the bolt 38 at an inner end of the housing 24. The nut 42 is received within a bore 44 in the piston 36. Spring 46 biases the nut 42 to a position such that the threads within the nut 42 are aligned with the beginning thread 48 of the threaded portion 40. The portion 49 below thread 48 is not threaded. Thus, should the bolt head 41 be turned in a first direction, the thread 48 will be engaged on threads 42, and the nut will begin to be drawn upwardly on the threaded portion 40. On the other hand, should the head 41 be turned in the opposed direction, the nut 42 will not be drawn onto the thread 48 and the nut 42 will not be moving onto the threaded portion 40.

As also shown in FIG. 1, the small spring 46 has biased the bolt head 41 to a position such that there is a slight clearance 70 between the bolt head 41 and the housing 44. A snap ring 64 prevents further outward movement of the bolt 38. The spring 46 biases the nut 42 and hence the bolt 38 outwardly to this position. An observer of the clearance 70 will know that the power spring 28 remains uncaged in a brake actuator 20.

Figure 2:
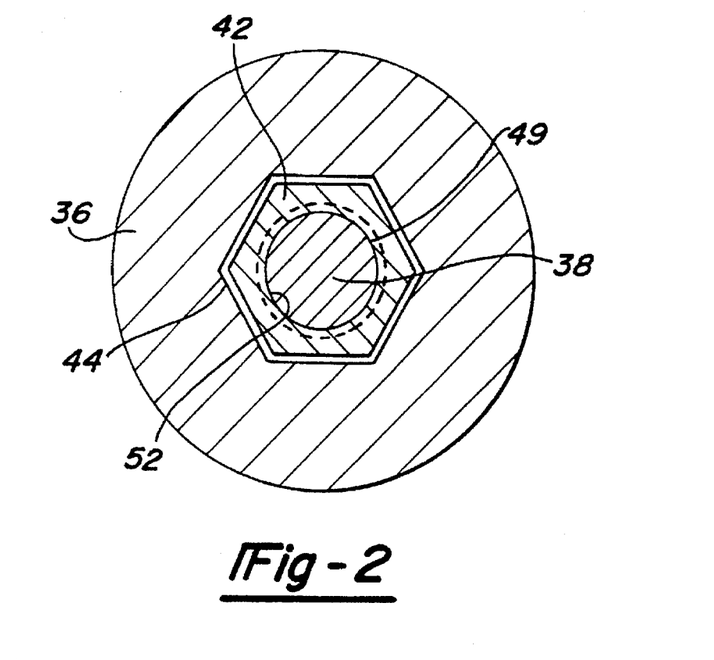
FIG. 2 is a cross-sectional view along line 2—2 as shown in FIG. 1.

As shown in FIG. 2, the bore portion 44 has an inner periphery that corresponds to the outer periphery of the nut 42. In this illustration the nut and bore are both shown as being hexagonal, although other cross sections may well come within the scope of this invention. As also shown, a lower unthreaded portion 49 of the bolt 38 is received within a bore 52 of the nut 42. Bore 52 is threaded.

Figure 3:
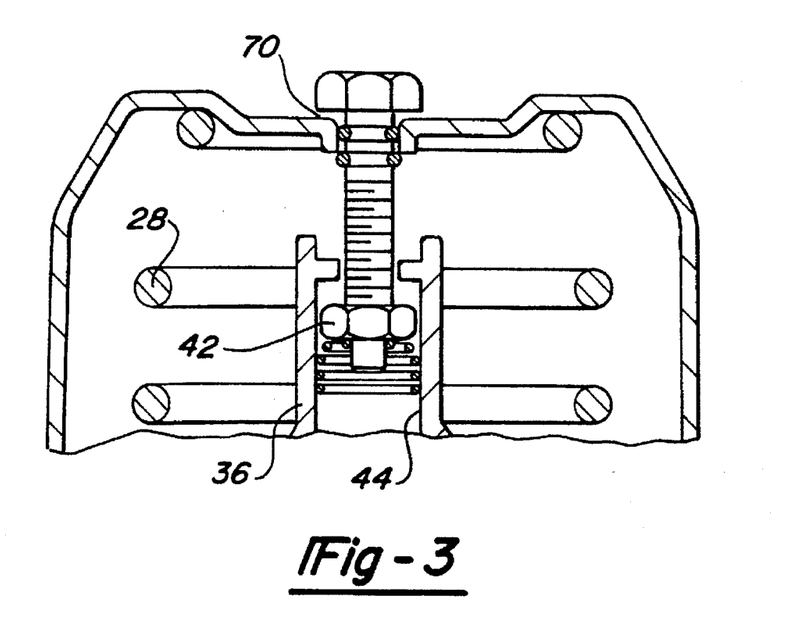
FIG. 3 is a cross-sectional view of the spring brake actuator moving towards the actuated position.

As shown in FIG. 3, when the spring 28 expands it moves the piston 36 downwardly along with the push rod 34. This movement does not affect the release tool since the nut 42 slides in bore 44. That is, as the spring 28 moves from the position shown in FIG. 1 to the position shown in FIG. 3, the nut 42 merely slides within the bore 44. As shown in FIG. 3, it is possible to design a long spring which will keep clearance 70 during this movement. The observer will know that the power spring 28 remains uncaged.

In some instances, when the brake actuator is in the expanded position, an operator would like to capture or cage the power spring 38 mechanically from outside of the brake actuator 20. The prior art has typically provided a release bolt which is turned to move a mechanical member within the housing to capture the spring 28.

Figure 4:
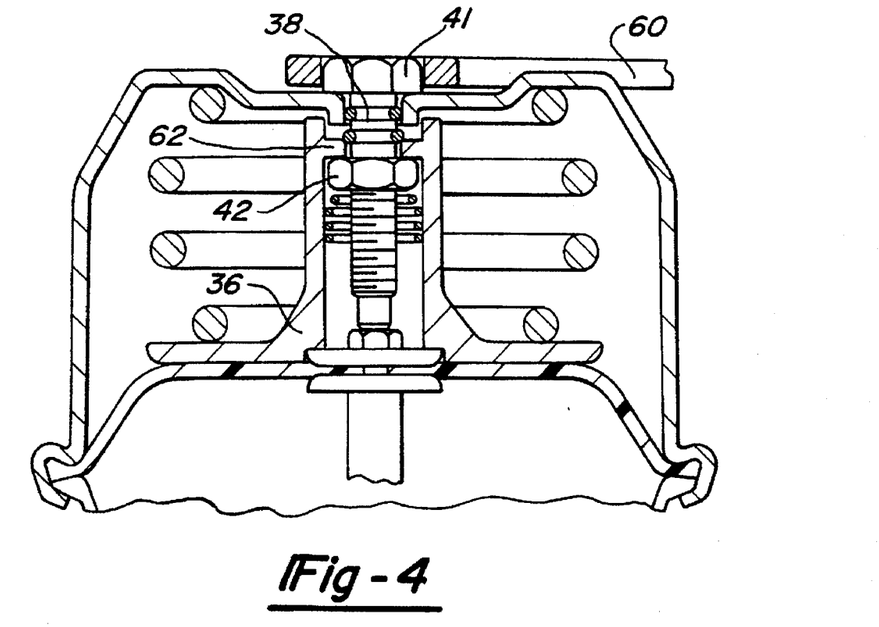
FIG. 4 shows the spring brake actuator of FIG. 1 with the spring caged.

As shown in FIG. 4, tool 60 may begin to turn the head 41 of the bolt 38. Upon initially turning the bolt 38, the nut 42 will be engaged on the threads of the threaded portion 40. Continued turning of the head 41 will cause the nut 42 to move axially upwardly along the threaded portion 40.

Eventually, the nut 42 contacts a flange 62 at an outer end of the piston 36. At that time, continued turning of the bolt head 41 causes the nut 42 to move the piston 36. This movement captures or cages the spring 28. As the nut initially contacts flange 62, the first movement that occurs is the movement of the bolt head 41 inwardly towards the housing 24. After the nut 42 contacts flange 62, the force of the spring 46 no longer biases the nut outwardly. Rather, as the nut turns, the nut and bolt move inwardly to eliminate clearance 70. Upon further tightening, the nut 42 begins to draw the flange 62, piston 36, and hence spring 28 to the caged position such as shown in FIG. 4. Thus, an observer seeing there is no longer a clearance 70 would recognize that the power spring is partially or fully caged.

Figure 5:
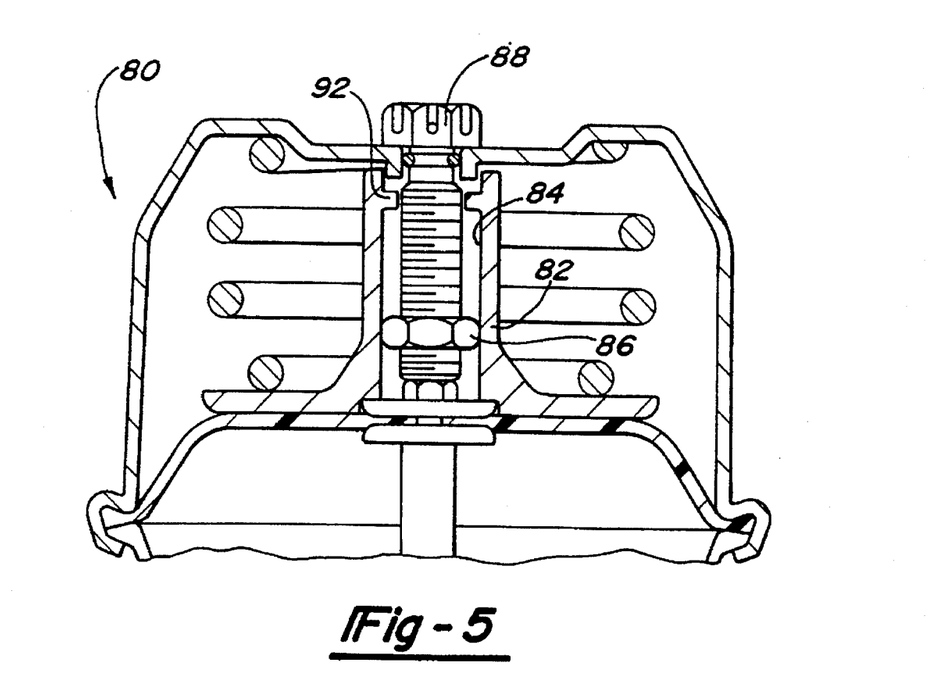
FIG. 5 shows a second embodiment release bolt.

FIG. 5 shows another embodiment actuator 80. In actuator 80, there is no small spring. The spring piston 82 includes a bore 84 as in the previous embodiment. A nut 86 rides along a bolt 88. Upon turning of the bolt 88, the nut 86 moves axially within the bore 84 as in the above embodiment. There are threads 90 along the length of the bolt 88, and the nut 86 is always received on the threads 90 in a preferred embodiment. Flange 92 extends inwardly from the piston 82. As the bolt 88 is turned, the nut 86 moves and eventually contacts the flange 92. Continued turning of the bolt head 88 cages the spring as in the previous embodiment.

The brake actuators shown in FIGS. 1–5 utilize diaphragms as their actuating member in the spring chamber.

Figure 6A:
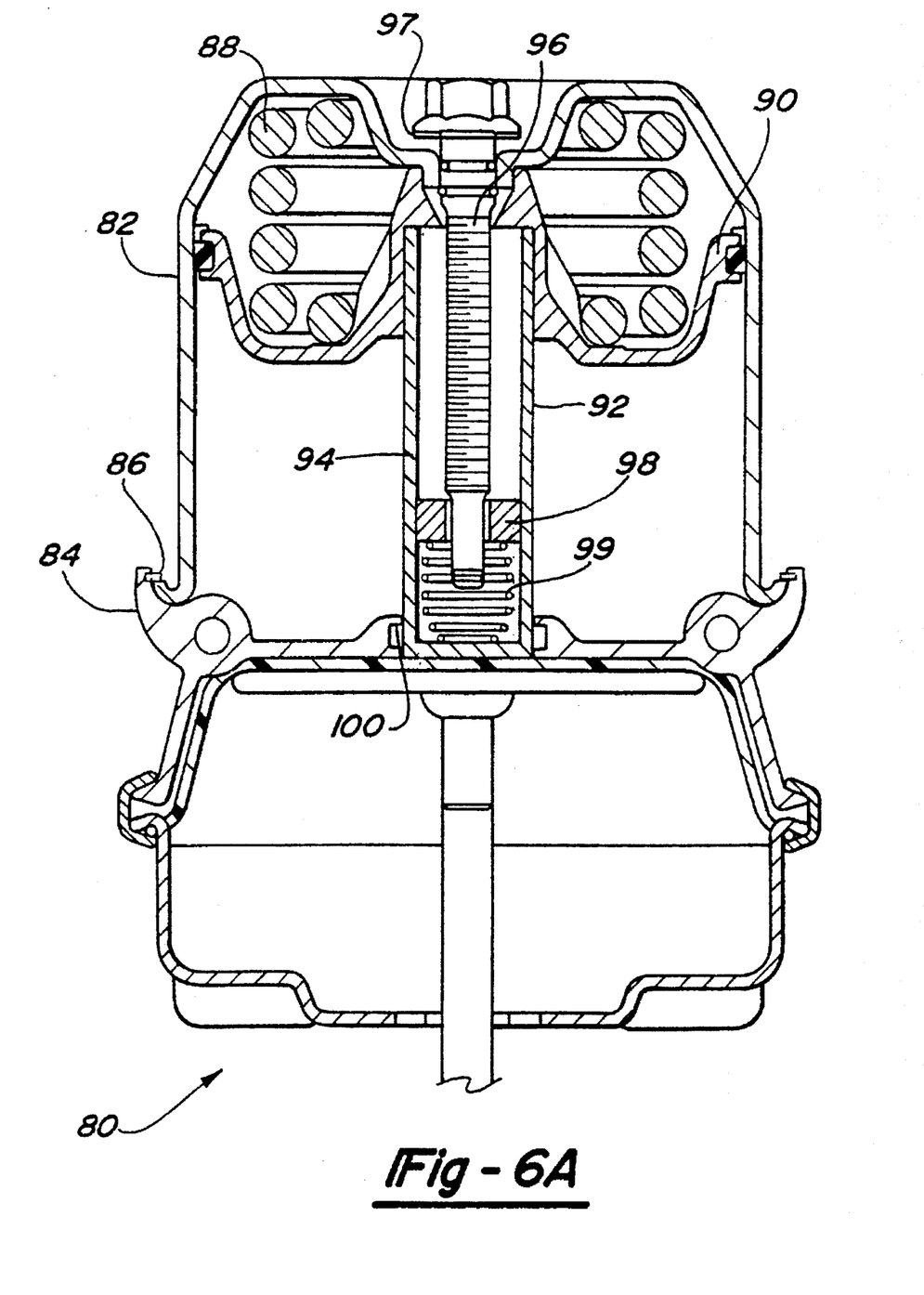
FIG. 6A shows a third embodiment brake actuator.
Figure 6B:
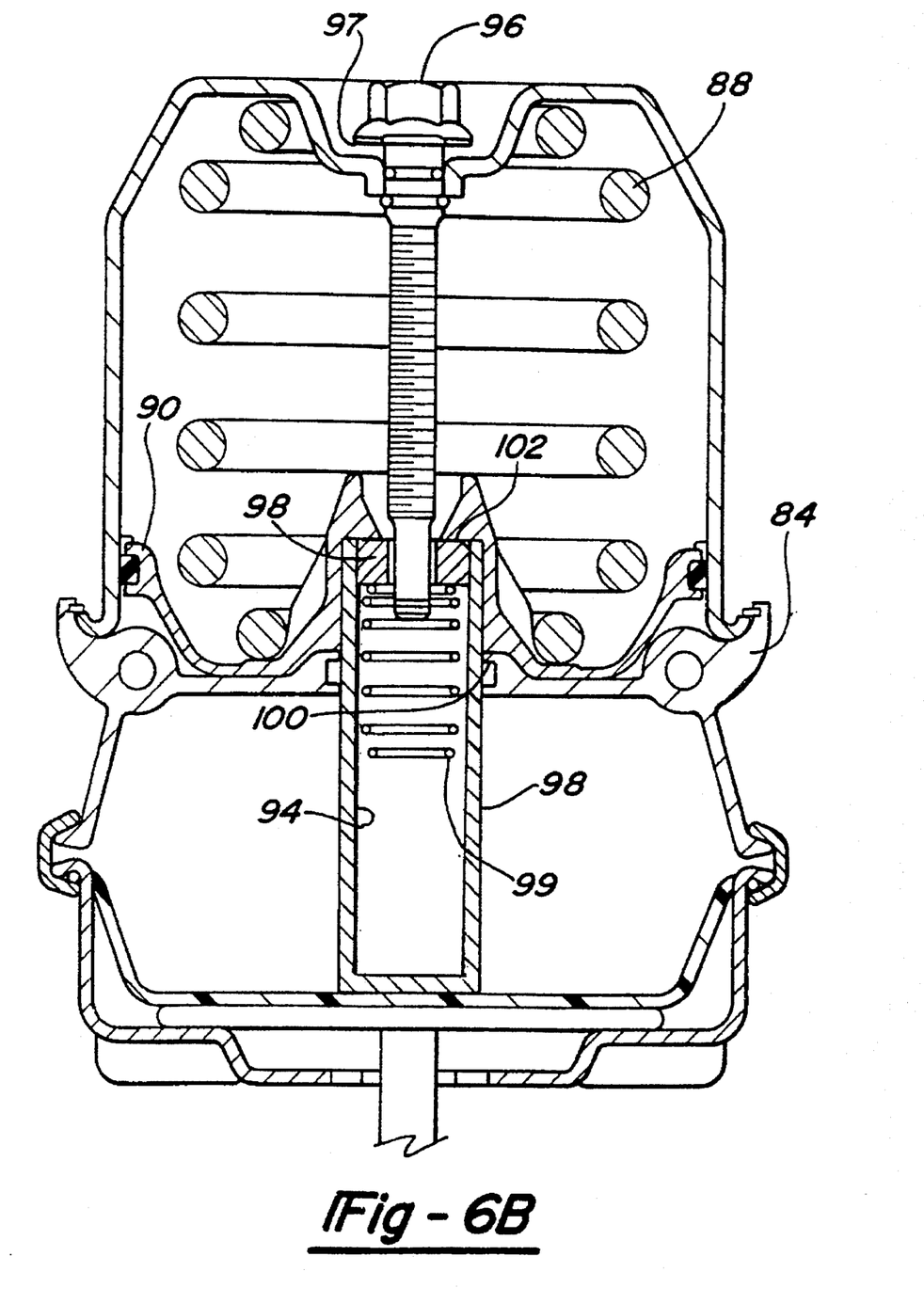
FIG. 6B shows the embodiment of FIG. 6A having moved to a different operational position.

The embodiment 80 shown in FIG. 6A–6B disclose a piston type brake actuator. Other features of a embodiment 80 are also shown in a FIG. 6A–6C embodiment. It should be understood that the features generally shown for the release tool in FIGS. 6A–6C would also find benefits in diaphragm brakes. Moreover, the release tools shown in FIGS. 1–5 may also find benefits in piston brakes.

As shown in FIG. 6A, a piston brake 80 incorporates a housing member 82 that is connected to a central housing 84, as with a clip 86 or other known connection. A power spring 88 biases a piston 90 outwardly. Piston 90 moves with a push rod 92 to actuate a yoke as in the previous embodiments. Push rod 92 is formed with a bore 94, and a bolt 96 extends downwardly into bore 94. A nut 98 is biased upwardly by a small spring 99 as in the prior embodiment. As shown, bolt 96 is thus spaced by a small amount 97 from the outer housing 82, again to provide an indication to an observer that the power spring is not caged. In this embodiment, since the bolt 96 extends into the push rod 92, brake actuator 80 may be of a relatively smaller axial outer envelope size than if the push rod 92 were solid. A portion of the bolt length is thus taken up by having it extend into the hollow push rod 92. As shown, the push rod 92 extends through an opening 100 in the central housing 84. In the position shown in FIG. 6A, the power spring 88 is compressed by air pressure in the chamber beneath the piston 90.

As shown in FIG. 6B, the power spring 88 has now expanded to drive the piston 90 against the center housing 84. The push rod 92 extends through the opening 100; and the yoke is actuated as is known. As also shown, the nut 98 is slightly spaced from the flange 102 in this position. The clearance 97 remains in this position, and the dimensions are preferably selected such that the piston 90 bottoms out on the housing 84 before the flange 102 contacts the nut 98 and overcomes the small force of the spring 99. Thus, an observer will also be able to tell that the power spring 88 remains uncaged in this position.

Figure 6C:
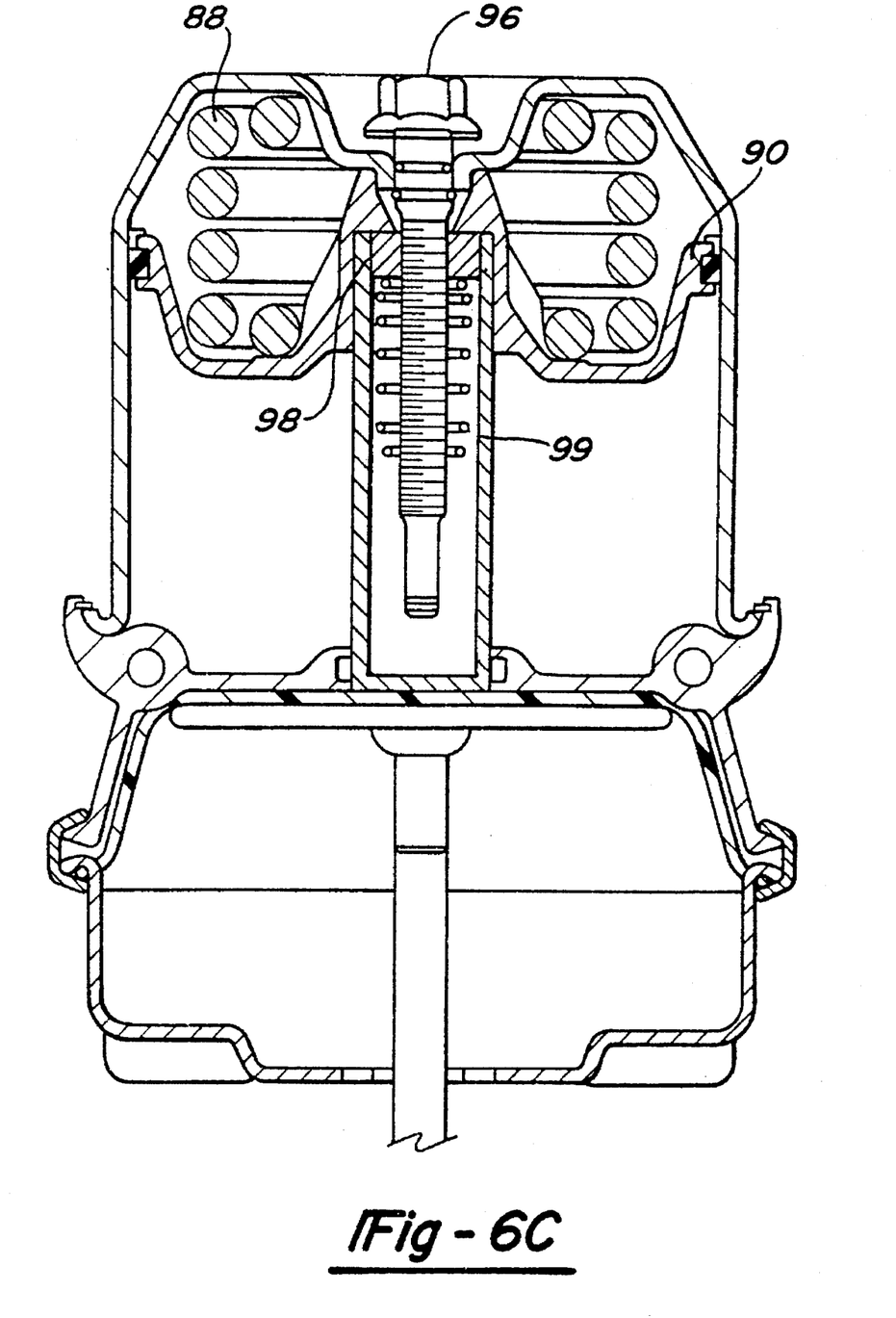
FIG. 6C shows the embodiment of FIG. 6A having moved to yet another operational position.

As shown in FIG. 6C, the bolt 96 has now been turned to move the nut 98 and cage the piston 90 and power spring 88. Although the hollow push rod concept has been illustrated with the small return spring embodiment as discussed above, it should be understood that the embodiment shown in FIG. 5 wherein there is no spring could also be combined with this hollow push rod embodiment.

In a method of caging a brake actuator according to the present invention, one initially provides a brake actuator with a threaded release tool that may be turned to cage a power spring without moving the tool axially away from the housing member. In a preferred embodiment, the method includes the steps of providing such a release tool which threadably engages a nut, with the nut moving axially when turned by the release bolt to cage the power spring. The method further includes the steps of beginning to turn the release bolt to move the nut and cage the power spring.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A spring brake actuator comprising:
   a central housing;
   an outer housing connected to said central housing, and a power spring received between said central housing and said outer housing;
   said power spring moving axially to move an actuation member axially outwardly of said central housing member to selectively actuate a brake member;
   a release structure having a portion accessible from outside of said outer housing, said release structure being operable to capture said power spring such that said power spring no longer forces said actuation member outwardly of said central housing, said release structure being operable to engage said power spring, said release structure including a bolt extending through said outer housing into a caging member which selectively cages said power spring, a nut received within said caging member and selectively threadably engaged on said bolt such that turning said bolt causes said nut to move axially, said nut being selectively engaged with a surface on said caging member such that upon turning of said bolt to cause said nut to move axially outwardly, said nut contacts a portion of said caging member to move said caging member axially outwardly to cage said power spring, said bolt being movable axially relative to said outer housing with said nut.

2. A spring brake actuator as recited in claim 1, wherein said power spring is received on a power spring piston engaging a diaphragm, said diaphragm being secured between said outer housing and said central housing.

3. A spring brake actuator as recited in claim 1, wherein said power spring is received on a piston actuator, said piston actuator moving within said outer housing to actuate a brake.

4. A spring brake actuator as recited in claim 1, wherein said actuation member is a push rod having a hollow bore, and at least a portion of said bolt extending into said hollow bore in said push rod.

5. A spring brake actuator as recited in claim 1, wherein said nut is spring biased relative to said bolt such that the threads on said nut are initially axially aligned with an initial thread on a threaded portion of said bolt, said bolt having an unthreaded portion extending axially inwardly from an inner end of said threaded portion, and said nut being received on said unthreaded portion such that upon initial turning of said bolt, said initial thread engages threads on said nut such that said nut will begin to move axially relative to said bolt upon further turning of said bolt.

6. A spring brake actuator as recited in claim 5, wherein a clip is attached to said bolt, said clip providing a stop limiting outward movement of said bolt due to said spring bias, said spring bias causing said bolt to be spaced slightly outwardly of said outer housing when said power spring is not captured, and said bolt being in a position moved toward said outer housing once said spring is captured to provide a visual indication of whether said power spring is captured.

7. A spring brake actuator as recited in claim 5, wherein said bolt extends into a bore in a caging member which contacts said power spring and physically cages said power spring when turned by said nut, said nut being received in said bore, said member having a flange at an outer end extending radially inwardly such that said nut abuts said flange to move said member, and thus said power spring to a caged position.

8. A spring brake actuator as recited in claim 7, wherein an outer peripheral configuration of said nut and an inner peripheral configuration of said bore are similar such that said nut may move axially within said bore, but may not rotate within said bore.

9. A spring brake actuator as recited in claim 5, wherein an O-ring is received on said release bolt at a position such that said O-ring contacts said outer housing throughout the movement of said release bolt, said O-ring being at an outer end of said release bolt and said spring bias being at an inner end of said release bolt to provide a centering force on said release bolt.

10. A spring brake actuator as recited in claim 1, wherein said nut moves on said bolt between a first extreme for fully caging said power spring to a second extreme where said power spring is fully released, and said release structure including an indicator to indicate when said nut is at one of said two extremes.

11. A spring brake actuator as recited in claim 9, wherein said one of said two extremes is when said nut has fully caged said power spring.

* * * * *